United States Patent
Santais

(10) Patent No.: US 12,474,695 B2
(45) Date of Patent: Nov. 18, 2025

(54) START-UP METHOD FOR MULTI-MODULE MACHINE

(71) Applicant: SIDEL PARTICIPATIONS, Octeville-sur-Mer (FR)

(72) Inventor: Franck Santais, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 331 days.

(21) Appl. No.: 17/764,423

(22) PCT Filed: Sep. 30, 2020

(86) PCT No.: PCT/EP2020/077385
§ 371 (c)(1),
(2) Date: Mar. 28, 2022

(87) PCT Pub. No.: WO2021/064031
PCT Pub. Date: Apr. 8, 2021

(65) Prior Publication Data
US 2022/0334564 A1    Oct. 20, 2022

(30) Foreign Application Priority Data
Oct. 3, 2019 (FR) ...................................... 1910946

(51) Int. Cl.
*G05B 19/418* (2006.01)
(52) U.S. Cl.
CPC ............... *G05B 19/41865* (2013.01); *G05B 2219/37239* (2013.01)
(58) Field of Classification Search
CPC .............. G05B 19/41865; G05B 2219/37239

USPC ......................................................... 700/197
See application file for complete search history.

(56) References Cited

U.S. PATENT DOCUMENTS

| 4,736,116 | A | 4/1988 | Pavlak, Jr. |
| 2003/0191544 | A1 | 10/2003 | Faulhammer et al. |
| 2005/0131552 | A1 | 6/2005 | Yuan |
| 2014/0316602 | A1 | 10/2014 | Kawai et al. |
| 2016/0127593 | A1* | 5/2016 | Tanaka ................... G03G 15/80 399/88 |
| 2016/0136868 | A1* | 5/2016 | Haller ..................... B29C 49/12 425/162 |

FOREIGN PATENT DOCUMENTS

EP    2793353 A1    10/2014

OTHER PUBLICATIONS

International search report dated Oct. 28, 2020.

* cited by examiner

Primary Examiner — Jigneshkumar C Patel
(74) Attorney, Agent, or Firm — Blake T. Hudson

(57) ABSTRACT

A method of starting a machine comprising a plurality of modules, each module having a standard run-up time until optimum operating conditions are obtained. The method includes acquiring for each module of an initial state at a time T0 and a run-up time to reach the optimum operating conditions from the time T0. The method also includes identifying a slow module having the longest run-up time and determining a time T1 of optimum operation, following run-up, at which said slow module has its optimum operating conditions. For each module (6) other than the slow module (6), the method establishes a starting or run-up time set point for which its optimum operating conditions are reached only at the time T1 or in the immediate vicinity of the time T1.

20 Claims, 3 Drawing Sheets

START-UP METHOD FOR MULTI-MODULE MACHINE

CROSS-REFERENCE TO RELATED APPLICATIONS

This application is a 371 U.S. National Stage Application of PCT Application Serial Number PCT/EP2020/077385 filed on Sep. 30, 2020, which application claims the benefit of and priority to French Application No. FR1910946, filed Oct. 3, 2019, the entire contents of each of which are hereby incorporated herein by reference.

The field of the invention is that of the design and of the production of plastic material containers.

To be more precise, the invention concerns a method of starting a machine for producing plastic material containers.

Plastic material containers are produced in a machine comprising a plurality of modules by transformation of a preform into a finished container.

A production machine of this kind conventionally comprises various modules including at least a heating module, a blowing module, a decontamination module, a filling module and a module for capping the containers after filling.

Moreover, conveyor modules are interleaved between the aforementioned modules to enable the transfer of the containers or of the preforms between the various units.

To be more precise, a container is produced by heating a preform which is thereafter blown to form a container with its definitive shape. The container formed or the preform formed may then be decontaminated and then filled and capped before being labeled and palletized, where applicable.

When starting a machine, it is conventional for all of the modules to be started at the same time until each module reaches optimum operating conditions then enabling production to start.

However, it is found that each module does not have the same starting time as the other modules.

In the prior art, when starting a machine, all the modules that constitute the machine are started at the same time and each reaches its optimum operating conditions at a different time.

Two major disadvantages result from this.

Firstly, if the modules are started at the same time, the modules only rarely, or even never, reach their optimum operating conditions at the same time.

Some modules that reach their optimum operating conditions faster then continue to operate with no load, which increases the wear thereof prematurely and also increases the energy consumption of the machine.

Secondly, the run-up until optimum operating conditions are reached may for some modules generate a risk of mechanical stress, also known as mechanical overstress.

In fact, for the machine to be operational as rapidly as possible, some modules are started brutally, that is to say with steep acceleration ramps, and so mechanical stresses can appear and, over time, cause deterioration or even failure of the module and/or premature ageing of some components.

These disadvantages are all the more real in the event of restarting a machine after an emergency stop.

In fact, some modules may be ready more rapidly than others and must wait before they are used. Modules that have a particularly long heating or starting time may therefore be overstressed in order to reduce the starting time of the machine and therefore exposed to severe risks of deterioration.

A particular objective of the invention is to alleviate the disadvantages of the prior art.

To be more precise, an objective of the invention is to propose a method of starting a machine enabling limitation of the risks of deterioration of the modules constituting the machine when starting it.

Another objective of the invention is to provide a starting method of this kind that makes it possible to increase the service life of the various modules constituting the machine.

Another objective of the invention is to provide a starting method of this kind that makes it possible to control and to adapt the starting time up to optimum operating conditions of the machine.

These objectives, together with others that will become apparent hereinafter, are achieved thanks to the invention which has for object a method of starting a machine comprising a plurality of modules, each module having a standard run-up time until optimum operating conditions are obtained, characterized in that the method comprises the steps of:
  acquisition for each module of an initial state at a time T0 and a run-up time to reach the optimum operating conditions from the time T0;
  identification of a slow module having the longest run-up time and determining a time T1 of optimum operation, following run-up, at which said slow module has its optimum operating conditions;
  for each module other than the slow module, establishing a starting or run-up time set point for which its optimum operating conditions are reached only at the time T1 or in the immediate vicinity of the time T1.

By establishing a starting or run-up time set point of this kind specific to each module, energy consumption and premature wear of the modules are reduced.

In fact, by using for each module a starting or run-up time set point, each module can be brought to its optimum operating conditions in a "gentle" manner, that is to say not brutally.

Moreover, the energy consumption may be progressive for each module or limited to the real use of the module, that is to say its nominal starting or its real use.

Advantageously, after the acquisition step and before the identification step, the method comprises the steps of:
  detection of an intermediate run-up state of at least one module;
  determination of a remaining run-up time for each module.

This enables adaptation of starting as a function of the real conditions of the production machine.

In fact, if a machine is stopped between two production cycles, its starting time is less than the starting time of a so-called cold machine, that is to say a machine out of use for several hours or even several days.

Preferably, before the identification of the slow module, the method also comprises a step of acquisition for each module of a set point for temporary modification of its run-up time to reach the optimum operating conditions from the time T0.

In particular this enables a production machine to be started only partially for example. There is a particular benefit of partial starting of a production machine during a reliability check after a maintenance operation for example.

For example, a particular module may be started independently of the others under degraded operating conditions to verify it has been repaired correctly.

Moreover, this enables a production machine to be started slowly in order to monitor its correct operation in a slow and continuous manner and then to increase its execution speed up to its nominal operating conditions.

Preferably, when establishing each starting or run-up time set point, the method comprises a step of taking into consideration production parameters of the machine.

For production at a low throughput, the starting time of the production machine may then be extended whereas for a high throughput the starting time may be shortened or, at least, optimized to the shortest.

Advantageously, when establishing each run-up set point, the method comprises a step of taking into consideration climatic parameters external to the machine.

In fact, external conditions may influence the starting time of the machine.

For example, high humidity may lead to slippage of two components moving one on the other or a high temperature may require a shorter heating time from a preform heating unit.

In accordance with a first embodiment, the method comprises a step of transmission to each module of a starting or run-up time set point produced in a simultaneous manner.

This makes it possible to simplify the transmission of information between a computer unit controlling the machine and all of the modules.

In accordance with a second embodiment, the method comprises a step of transmission to each module of a starting or run-up time set point produced in a deferred manner.

In this case, an operator is able to preserve control over the progress of the starting of the machine and, where necessary, to control manually the starting of one particular module of the production machine.

Other features and advantages of the invention will become more clearly apparent on reading the description of the preferred embodiment of the invention given by way of nonlimiting and illustrative example and from the appended drawings in which.

Figure 1:
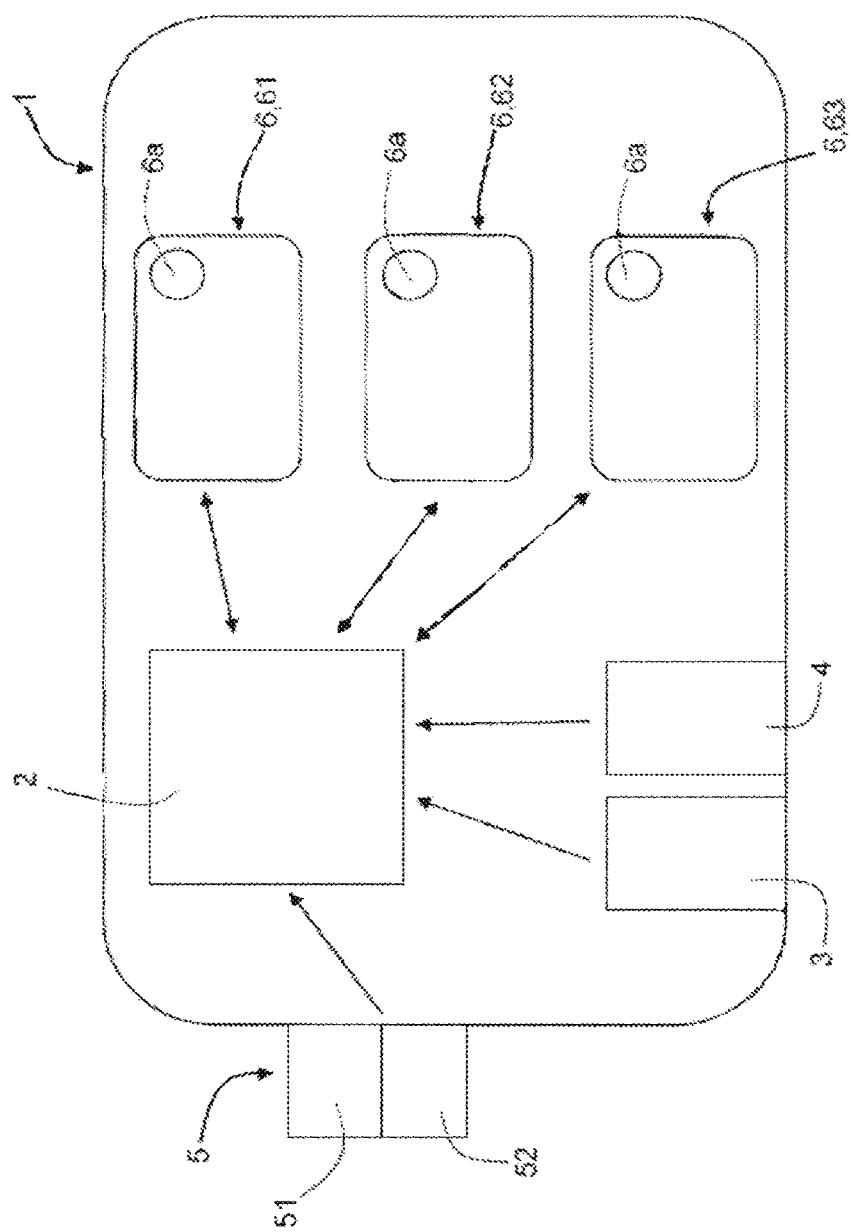
FIG. 1 is a schematic representation of a production machine according to the invention.

FIG. 1 illustrates in a schematic manner a machine 1 according to the invention for production of plastic material containers, the machine 1 comprising:
  a computer 2;
  an emergency stop 3,
  memory storage means 4,
  sensors 5, and
  a plurality of modules 6 for the production of containers.

To be more precise, as is illustrated in a nonlimiting manner in FIG. 1, the production machine comprises three modules 6, namely a first module 61, a second module 62 and a third module 63.

The first module 61 is for example a unit for heating preforms, the second module 62 is for example a transfer unit, the third module 63 is for example a unit for forming containers.

During the production of the containers, preforms are first introduced into the first module 61, namely the heating unit, in order for the plastic material constituting them to be softened and to reach a glass transition temperature at which the plastic material can be blown.

When the preforms have reached the ideal temperature, they are then directed to the production unit via the transfer unit.

For example, the transfer unit comprises a wheel carrying holding means intended to recover each preform leaving the heating unit, that is to say the first module 61, to direct it to the third module 63, that is to say the forming unit.

The forming unit then includes a carousel carrying a plurality of molds into which preforms are introduced in order to be blown and to assume their final or quasi-final shape.

When starting the machine, each of the modules 6 has its own starting time.

The starting time is calculated on the basis of initial conditions under which the module 6 is started until the latter reaches optimum operating conditions.

Figure 2:
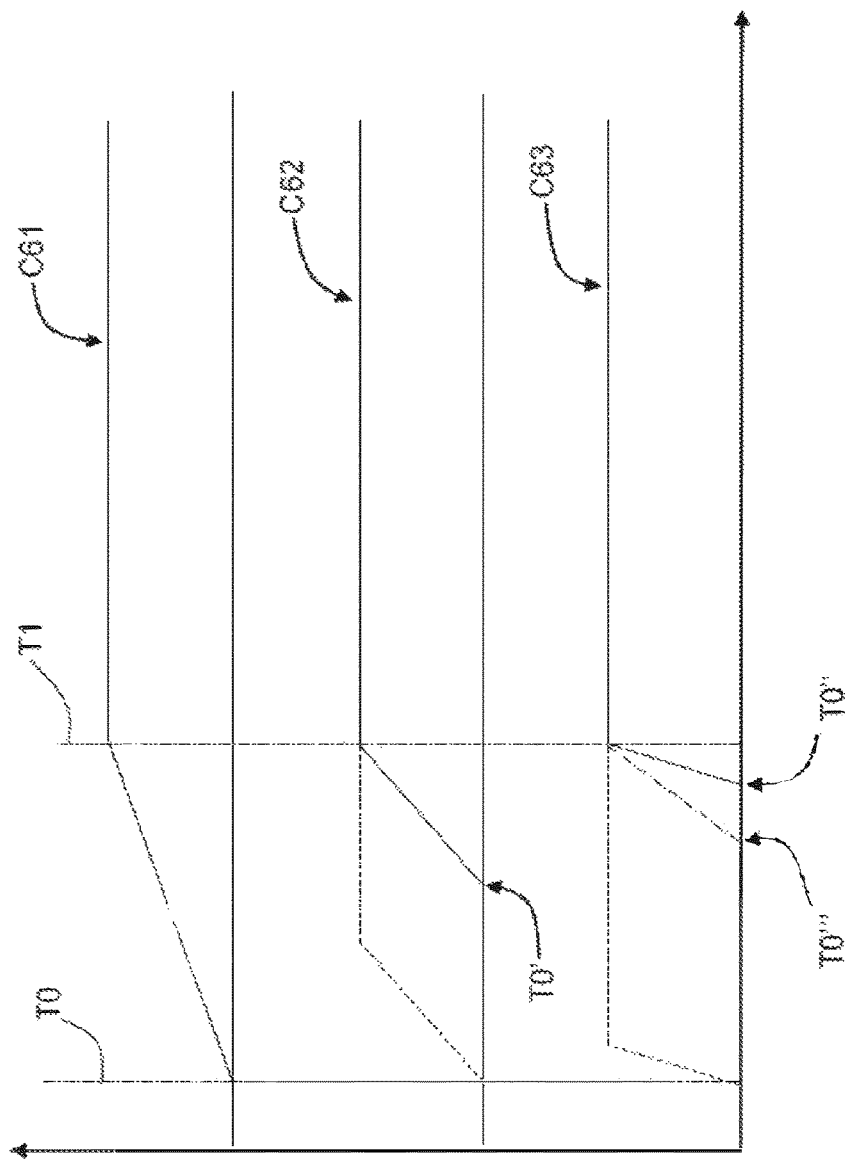
FIG. 2 is a schematic view illustrating the run-up of three modules of a production machine under first conditions.
Figure 3:
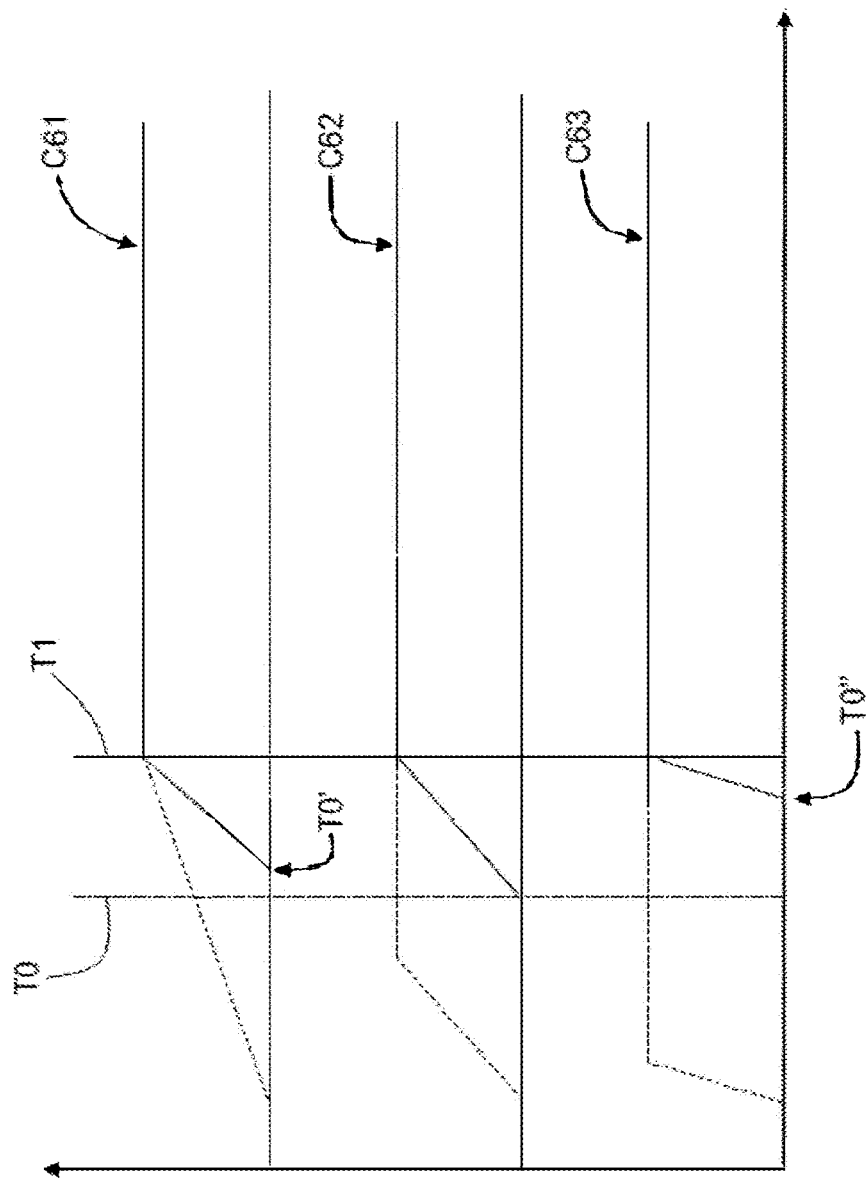
FIG. 3 is a schematic view illustrating the run-up of three modules of a production machine under second conditions.

FIGS. 2 and 3 illustrate run-up timing diagrams of the modules 6. The numerical data in these timing diagrams is given by way of illustrative and nonlimiting example.

To be more precise, FIGS. 2 and 3 show:
  a first curve C61 representing the run-up of the first module 61,
  a second curve C62 representing the run-up of the second module 62,
  a third curve C63 representing the run-up of the third module 63.

In accordance with a first example, and with reference to FIG. 2, the first module 61, that is to say the heating unit, has a starting time of about 30 seconds.

The second module 62 has a starting time of about 12 seconds.

The third module 63 has a starting time of about 5 seconds.

Referring to FIG. 2, for the second module 62 and the third module 63, the conventional starting conditions from a state 0, that is to say a departure from standby of the module 6, are represented in dashed line.

In the prior art, when the modules 6 are started or the machine 1 is started, all the modules 6 are started at the same time.

Accordingly, as seen in FIG. 2, the third module 63 reaches its optimum operating conditions first, followed by the second module 62 and finally the first module 61.

Thus the time for heating and operating with no load is high, up to starting of production for the second module 62 and the third module 63.

This kind of operation with no load can in due course cause deterioration of the modules 6.

In fact, some modules 6 are designed for nominal operation under load and, if nominal operation is prolonged without the modules 6 being under load, the modules 6 can become overheated, which degrades them prematurely.

As shown in FIG. 1, each module 6 comprises means 6a for analysis and for communication with the computer 2.

Accordingly, on starting the machine 1, or restarting it, each module 6 communicates with the computer 2 to transmit to it a run-up time that is specific to it.

The parameters of the computer 2 are then set to implement a method of starting enabling limitation of premature wear of the various modules 6.

To do this, the method comprises the steps of:
  acquisition for each module 6 of an initial state at a time T0 and a run-up time to reach the optimum operating conditions from the time T0;
  identification of a slow module 6 having the longest run-up time;
  for each module 6 other than the slow module 6, establishing a starting or run-up time set point.

To be more precise, the computer 2 acquires from each module 2 the run-up time thereof in order to compare them and to identify the module 6 that is slowest to reach its optimum operating conditions.

When the slow module 6 has been identified, the computer 2 establishes for each of the other modules 6 the starting or run-up time for which the optimum operating conditions are reached only at a time T1 or in the immediate vicinity of the time T1, that is to say from the time at which the slow module 6 for its part has reached its optimum operating conditions.

Referring to FIG. 2, in a first instance, the slowest module 6 is the first module 61, that is to say the heating unit.

In fact, from initial starting of the machine 1, the temperature in the heating unit is close to or equal to the ambient temperature.

The heating unit therefore has to run up so as to reach a temperature close to the glass transition temperature of the preforms, for example about 77° C. if the preforms are made of polyethylene terephthalate (PET).

The time of 30 seconds for the oven to warm up therefore represents the longest time of all the modules 6 to reach optimum operating conditions.

In the first instance, illustrated by the solid lines in FIG. 2 for the second module 62 and the third module 63, the set point established by the computer 2 is a set point for modification of starting run up.

In other words, each module 6 retains its run-up time but the starting time of the run up is different for each of the modules 6.

As illustrated in FIG. 2, the starting of the run up of the first module 61 is therefore initiated at the time T0 and then, a few seconds afterwards, the starting of the run up of the second module 62 is initiated at a time T0' and, finally, the starting of the run up of the third module 63 is initiated at a time T0".

Thus, along the time axis, each module 6 is run up after the others until all of the modules 6 reach their nominal operating conditions at the time T1.

According to a variant of this first instance, as illustrated by the chain-dotted lines in FIG. 2 for the third module 63, it is the run-up time that is modified by the set point.

The initial run-up time of 5 seconds is therefore, for example, doubled to 10 seconds, so that the run up of the third module is effected in a "gentle" and slow manner from a time T0'" before the time T0".

The set point for the starting time of the run up of the third module 63 is therefore modified so that the third module reaches its nominal operating conditions at the time T1 despite the modification of its run-up time.

FIG. 3 illustrates a second instance in which the production machine 1 must be restarted after the emergency stop 3 has been tripped.

Each module 6 may have an inertia of operation.

In fact, in the case of the first module 61, the lowering of temperature in the heating unit is not immediate.

Because of thermal inertia, the temperature decreases in the heating unit in a gradual manner and not in a brutal manner.

When it establishes a set point for modification of the run-up time of a module 6, the method enables a slow or optimized run up, with the result that the latter module is not loaded in too brutal a manner under conditions provided to that end or more flexible conditions.

In the case of the second module 62, in which a speed of rotation of components mobile relative to each other makes it obligatory for the grease to reach a temperature allowing fluid movement between the two components, the method therefore makes it possible to avoid chemical transformation of the grease, for example by preventing the latter from hardening because of the effect of heat, or, to the contrary, from evaporating.

The starting set point adapted following tripping of the emergency stop 3 is stored temporarily in the memory storage means 4 so that in the event of a conventional start, that is to say with no emergency stop beforehand, each nominal cycle time is again used to allow the starting of the machine 6.

The storage of the set points following the tripping of the emergency stop 3 is therefore temporary, so that in the case of a conventional start, that is to say without tripping of the emergency stop 3 beforehand, each nominal cycle time is used again to enable the starting of the machine 1.

The release of the emergency stop 3 enables a new cycle of starting the machine 1 to be begun.

Referring to FIG. 3, the time T0 then becomes the time at which the emergency stop is released. The conditions taken into account by the computer 2 for the execution of the method are therefore the conditions on releasing the emergency stop 3.

The computer 2 therefore takes into account a run-up state of each of the modules 6 and determines a remaining run-up time for each module 6.

Referring to FIG. 3, it is seen that at the time T0 the first module 61 necessitates a starting time less than its nominal starting time because of the thermal inertia.

The starting time of the first module 61 therefore becomes less than the starting time of the second module 62, which for example remains constant despite the circumstances in which the machine 1 is started.

As illustrated in FIG. 3, at the time T0 the slowest module 6 is therefore then the second module 62.

After this the computer 2 creates an appropriate starting set point for the first module 61 and the third module 63.

Also, the starting of the second module 62 is initiated at the time T0, the starting of the first module 61 is initiated at the time T0' and the starting of the third module 63 is initiated at the time T0", the times T0' and T0" being after the time T0.

The sensors 5 preferably make it possible in particular to acquire evolution conditions of the machine 1, in particular a temperature external to the machine 1 by means of a temperature sensor 51, the relative humidity in the room in which the machine is located by means of a hygrometry sensor 52, or an external pressure.

In fact, these various parameters may influence the run-up time of each of the modules 6.

For example, for the first module 61, the run-up time of the heating unit will be greater if the temperature around the machine 1 is negative than if the temperature around the machine 1 is positive.

When the set point has been established, it is preferably transmitted to each of the modules 6 in a simultaneous manner for each module 6. Alternatively, a set point is transmitted individually to each of the modules 6 in a deferred manner, for example on starting each module 6.

The various parameters such as the standard run-up time to obtaining optimum operating conditions of each of the modules are in particular stored in the memory storage means 4.

In accordance with one advantageous embodiment, the method also comprises a step of taking into account production conditions of the machine 1, these production conditions, for example an hourly production volume, being stored in the memory storage means 4.

The invention claimed is:

1. An energy efficient and wear-reducing method of starting a machine comprising a plurality of modules, each module having a standard run-up time until optimum operating conditions are obtained, the method comprising:
   providing a machine comprising a plurality of modules;
   acquiring for each module of an initial state at a time T0 and a run-up time to reach the optimum operating conditions from the time T0;
   identifying a slow module having a run-up time comprising a greatest span of time and determining a time T1 of optimum operation, following run-up, at which said slow module has its optimum operating conditions;
   establishing, for each module other than the slow module, a starting or run-up time set point for which its optimum operating conditions are reached only at the time T1 or in the immediate vicinity of the time T1,
   controlling or operating the modules with the established starting or run-up time set point; and
   wherein energy consumption during the starting of the machine and modules thereof is optimized to maximize efficiency thereof, thereby eliminating premature wear of one or more modules during the starting of the machine.

2. The method as claimed in claim 1, wherein, after acquiring the run-up time for each module and before the identification step, the method further comprises:
   detecting an intermediate run-up state of at least one module;
   determining a remaining run-up time for each module.

3. The method as claimed in claim 2, wherein, before the identification of the slow module, it also comprises a step of acquisition for each module of a set point for temporary modification of its run-up time to reach the optimum operating conditions from the time T0.

4. The method as claimed in claim 2, wherein, when establishing each starting or run-up time set point, the method takes into consideration production parameters of the machine.

5. The method as claimed in claim 2, wherein, when establishing each run-up set point, the method takes into consideration climatic parameters external to the machine.

6. The method as claimed in claim 2, further comprising transmitting to each module of a starting or run-up time set point produced in a simultaneous manner.

7. The method as claimed in claim 2, further comprising transmitting to each module of a starting or run-up time set point produced in a deferred manner.

8. The method as claimed in claim 1, wherein, before the identification of the slow module, it also comprises a step of acquisition for each module of a set point for temporary modification of its run-up time to reach the optimum operating conditions from the time T0.

9. The method as claimed in claim 8, wherein, when establishing each starting or run-up time set point, the method takes into consideration production parameters of the machine.

10. The method as claimed in claim 8, wherein, when establishing each run-up set point, the method takes into consideration climatic parameters external to the machine.

11. The method as claimed in claim 8, further comprising transmitting to each module of a starting or run-up time set point produced in a simultaneous manner.

12. The method as claimed in claim 8, further comprising transmitting to each module of a starting or run-up time set point produced in a deferred manner.

13. The method as claimed in claim 1, wherein, when establishing each starting or run-up time set point, the method takes into consideration production parameters of the machine.

14. The method as claimed in claim 13, wherein, when establishing each run-up set point, the method takes into consideration climatic parameters external to the machine.

15. The method as claimed in claim 13, further comprising transmitting to each module of a starting or run-up time set point produced in a simultaneous manner.

16. The method as claimed in claim 13, further comprising transmitting to each module of a starting or run-up time set point produced in a deferred manner.

17. The method as claimed in claim 1, wherein, when establishing each run-up set point, the method takes into consideration climatic parameters external to the machine.

18. The method as claimed in claim 1, further comprising transmitting to each module of a starting or run-up time set point produced in a simultaneous manner.

19. The method as claimed in claim 1, further comprising transmitting to each module of a starting or run-up time set point produced in a deferred manner.

20. The method as claimed in claim 1, wherein the modules comprise a heating module, a blowing module, a decontamination module, a filling module and a module for capping containers that are blown by the blowing module and after filling by the filling module.

* * * * *